(12) United States Patent
Reinecke

(10) Patent No.: US 6,341,630 B2
(45) Date of Patent: Jan. 29, 2002

(54) FILLING AND HANDLING BOTTLES

(75) Inventor: Günter Reinecke, Solingen (DE)

(73) Assignee: SIG Hamba Filtec GmbH & Co. KG, Neunkirchen/Saar (DE)

( * ) Notice: Subject to any disclaimer, the term of this patent is extended or adjusted under 35 U.S.C. 154(b) by 0 days.

(21) Appl. No.: 09/793,739

(22) Filed: Feb. 26, 2001

(30) Foreign Application Priority Data

Feb. 25, 2000 (DE) .......................................... 100 08 876

(51) Int. Cl.⁷ .............................. B65B 43/42; B67C 3/00
(52) U.S. Cl. ..................... 141/168; 141/129; 141/165; 141/169; 141/176; 198/626.5
(58) Field of Search .................................. 141/129, 134, 141/163, 165, 168, 169, 171, 176; 198/626.5, 626.6, 817; 53/484

(56) References Cited

U.S. PATENT DOCUMENTS

| | | |
|---|---|---|
| 3,440,794 A | 4/1969 | Mueller |
| 3,901,180 A * | 8/1975 | Allen et al. .................... 118/2 |
| 3,938,847 A * | 2/1976 | Peyton ................... 294/110 R |
| 4,862,933 A | 9/1989 | Gies |
| 6,209,710 B1 * | 4/2001 | Mueller et al. .......... 198/470.1 |

FOREIGN PATENT DOCUMENTS

DE   196 42 987   4/1998

\* cited by examiner

*Primary Examiner*—Timothy L. Maust
(74) *Attorney, Agent, or Firm*—Herbert Dubno; Andrew Wilford

(57) ABSTRACT

A bottling apparatus has a frame and an endless conveyor element on the frame and having a horizontal lower stretch, an upper stretch above the lower stretch, and upstream and downstream corners where the element changes direction. A plurality of pairs of upstream and downstream plates are each secured to the element with the plates of each pair having confronting edges each in turn formed with a cutout. The cutouts of each pair form in the straight stretches a seat adapted to fit snugly around a neck of a bottle. The edges are spaced apart at the corners so that, at the corners, they cannot hold a bottle. A drive advances the element in a horizontal transport direction in the lower stretch and separates the plates of each pair at the upstream and downstream corners. A holder adapted to support at least one bottle at the upstream corner is movable between a loading position fitting the neck of the supported bottle to the cutout of the downstream plate at the upstream corner and a preloading position offset from the upstream corner. Respective spacers hold each of the plates offset from the conveyor element so that as the plates move around the corners they are separated at the edges. These spacers are mounting brackets fixed to the element and to the respective plates.

11 Claims, 6 Drawing Sheets

FILLING AND HANDLING BOTTLES

FIELD OF THE INVENTION

The present invention relates to an apparatus for filling and handling containers. More particularly this invention concerns such an apparatus for automatically filling bottles in a mass-production operation.

BACKGROUND OF THE INVENTION

In the production of sterile, filled, and capped bottles it is necessary to move the bottles or other containers through a series of treatment stages. Typically the containers are first sterilized, then subjected to one or two filling stages, then capped. These various actions must take place in a limited time and as closely as possible to each other to maintain sterility, specially when a milk product or something else that is susceptible of spoiling is being charged into the bottles.

U.S. Pat. No. 3,440,794 of Mueller shows a system for making individual-serving cups of milk or cream for restaurant use. It has a conveyor formed with an array of seats that the empty containers are dropped down into. The containers are downwardly tapered so that, when dropped into the seats, they come to rest on their rims. Such a system is not applicable to bottles having a restricted neck, as the body of the bottle is of much larger diameter so that they could not pass through the seats adapted to support them. Thus for such bottles recourse is had to cell-type systems which engage around the bodies of the bottles, so that the positions of the bottle necks and their small openings are not accurately determined. Furthermore the known systems are set up so that they can only work with one size of bottle; adaption to larger or smaller sizes is extremely difficult or impossible.

OBJECTS OF THE INVENTION

It is therefore an object of the present invention to provide an improved bottling system.

Another object is the provision of such an improved bottling system which overcomes the above-given disadvantages, that is which allows bottles of different sizes to be easily filled, while exactly positioning the fill openings of the bottles.

SUMMARY OF THE INVENTION

A bottling apparatus has according to the invention a frame and an endless conveyor element on the frame and having a horizontal lower stretch, an upper stretch above the lower stretch, and upstream and downstream corners where the element changes direction. A plurality of pairs of upstream and downstream plates are each secured to the element with the plates of each pair having confronting edges each in turn formed with a cutout. The cutouts of each pair form in the straight stretches a seat adapted to fit snugly around a neck of a bottle. The edges are spaced apart at the corners so that, at the corners, they cannot hold a bottle. A drive advances the element in a horizontal transport direction in the lower stretch and separates the plates of each pair at the upstream and downstream corners. A holder adapted to support at least one bottle at the upstream corner is movable between a loading position fitting the neck of the supported bottle to the cutout of the downstream plate at the upstream corner and a preloading position offset from the upstream corner.

With this system, therefore, the bottles are held at their necks. In practice the neck sizes of bottles do not vary much, even when the actual bodies of the bottles can range from fairly small, e.g. 4 oz, to quite large, e.g. 64 oz. Since the bottles hang from the lower stretch, the same apparatus can be used to fill large and small bottles with minor modification.

According to the invention respective spacers hold each of the plates offset from the conveyor element so that as the plates move around the corners they are separated at the edges. These spacers are mounting brackets fixed to the element and to the respective plates.

The cutouts in accordance with the invention are semicircular. In fact the plates of each pair are substantially spectrally identical. In addition each plate is formed with a plurality of the cutouts so that a row of the bottles can be held between each pair of plates.

The holder according to the invention is pivotal about a horizontal axis extending transverse to the transport direction between the loading and preloading positions. Thus the bottle is moved through an arcuate path to fit its neck to the cutout of the downstream plate at the upstream corner, then as the plates move on the upstream plate comes into position to capture the bottle neck. The holder is generally L-shaped and has pockets for as many bottles, normally three or four, that are loaded into the machine at a time.

Each bottle has a body that is substantially bigger than its neck. The seats fit snugly around the neck and form an opening too small for the body to pass through. As a result the bottles are held very solidly so that the filling and capping units downstream can do their jobs without difficulty.

The conveyor element has a upstream and downstream straight end stretches extending vertically between upstream and downstream ends of the upper and lower stretches. Above the lower stretch and below the lower stretch are the units for filling and capping the bottles as they travel from the upstream corner to the downstream corner. Thus the machine is quite compact, with the bodies of the bottles hanging out from the bottom of the machine where they have plenty of room.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
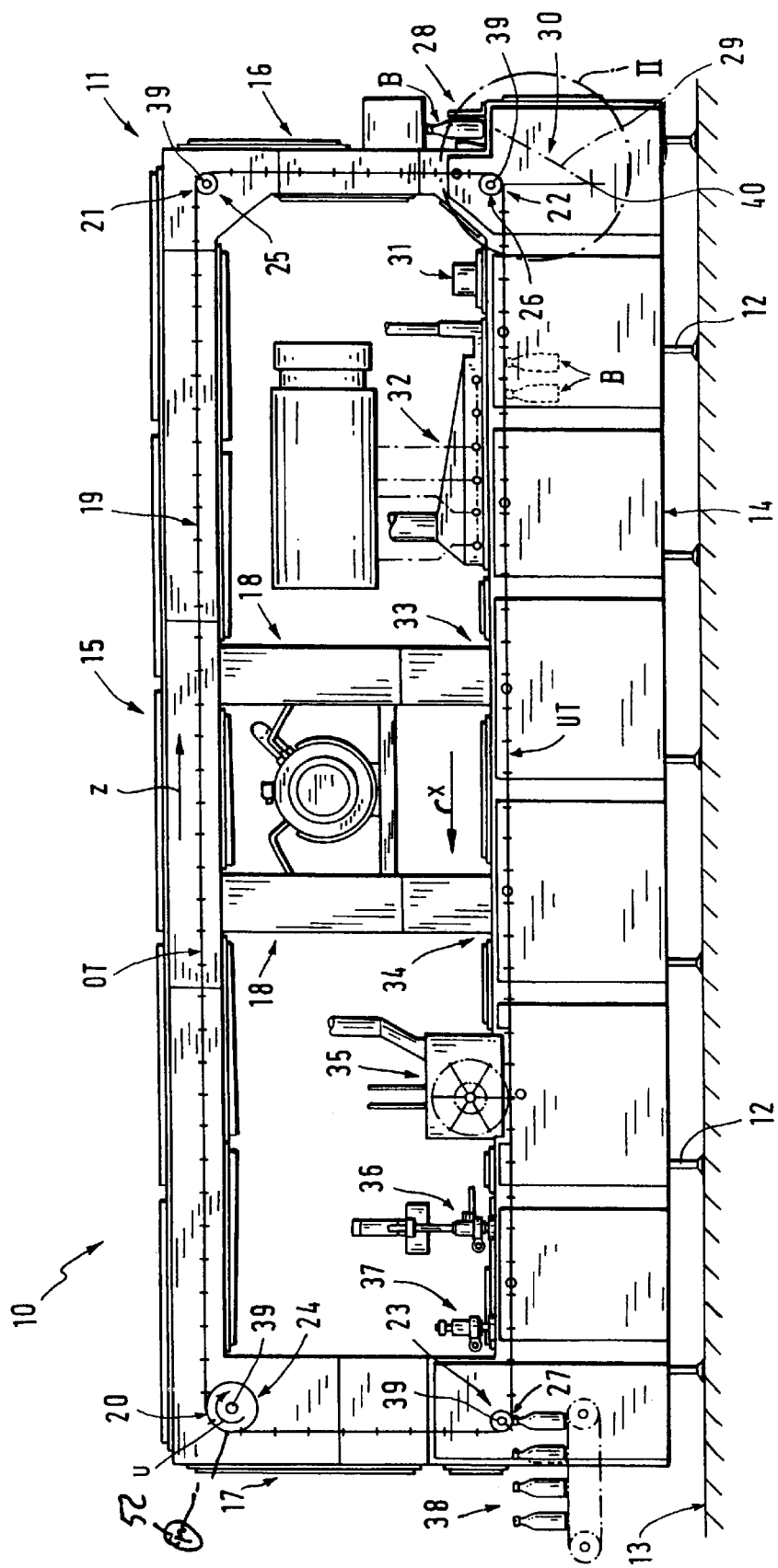
FIG. 1 is a small-scale side view of the bottling system according to the invention.

As seen in FIG. 1 a bottling system 10 in accordance with the invention has an open frame 11 supported via feet 12 on the floor or ground 13 and having a horizontally extending lower portion 14, a parallel upper portion 15, and upstream and downstream end uprights 16 and 17 connecting the ends of the portions 14 and 15. Centrally two further uprights 18 support the center of the upper portion 15.

An endless conveyor element 19 passes at upper corners 20 and 21 and lower corners 22 and 23 around respective wheels or rollers 24, 25, 26, and 27 carried on respective axles 39 and driven by a motor 52 to rotate in a direction u (see corner 20) so that a straight and horizontal lower conveyor stretch UT moves in the lower frame portion 14 in a transport direction x and an upper straight and horizontal stretch OT moves oppositely in the upper portion 15 in a direction z. An intake station 28 at the lower upstream corner 22 has a loader 29 having a pivotal bottle holder 30 that fits bottles B to the conveyor 19, whence they are moved in the transport direction x through a sensor station 31 which determines if any bottles are missing, a sterilizing station 32, a first filling station 33, a second filling station 34, a cap-cleaning and -feeding station 35, a cap fitting station 36, a cap crimping station 37, and an unloading station 38 at the lower downstream corner 23. The filling stations 33 and 34 load respective basically liquid materials into the bottles B and may correspond to the system shown in U.S. Pat. No. 4,862,933. The sterilizing system may correspond to that of German patent document 196 42 987 filed Oct. 18, 1996 by P. Gustafsson et al. The unloading station 38 is a simple conveyor on which the bottles B are set after being released from the conveyor 19 as described below.

Figure 2:
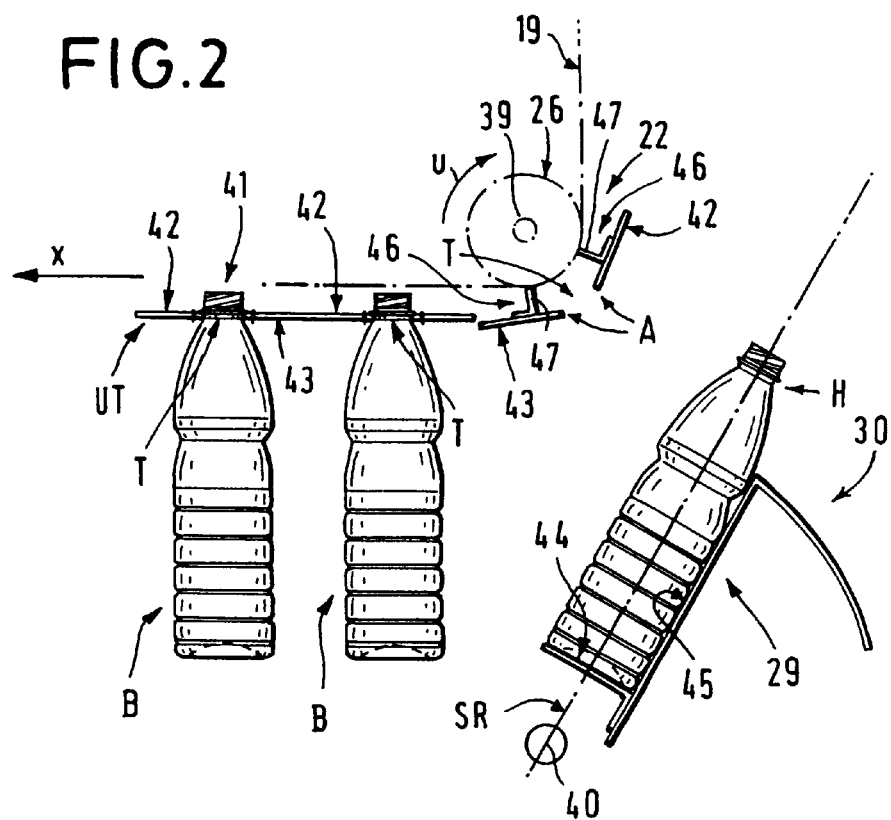
FIGS. 2 through 7 are larger-scale views of the loading subsystem in the area indicated at II in FIG. 1.
Figure 8:
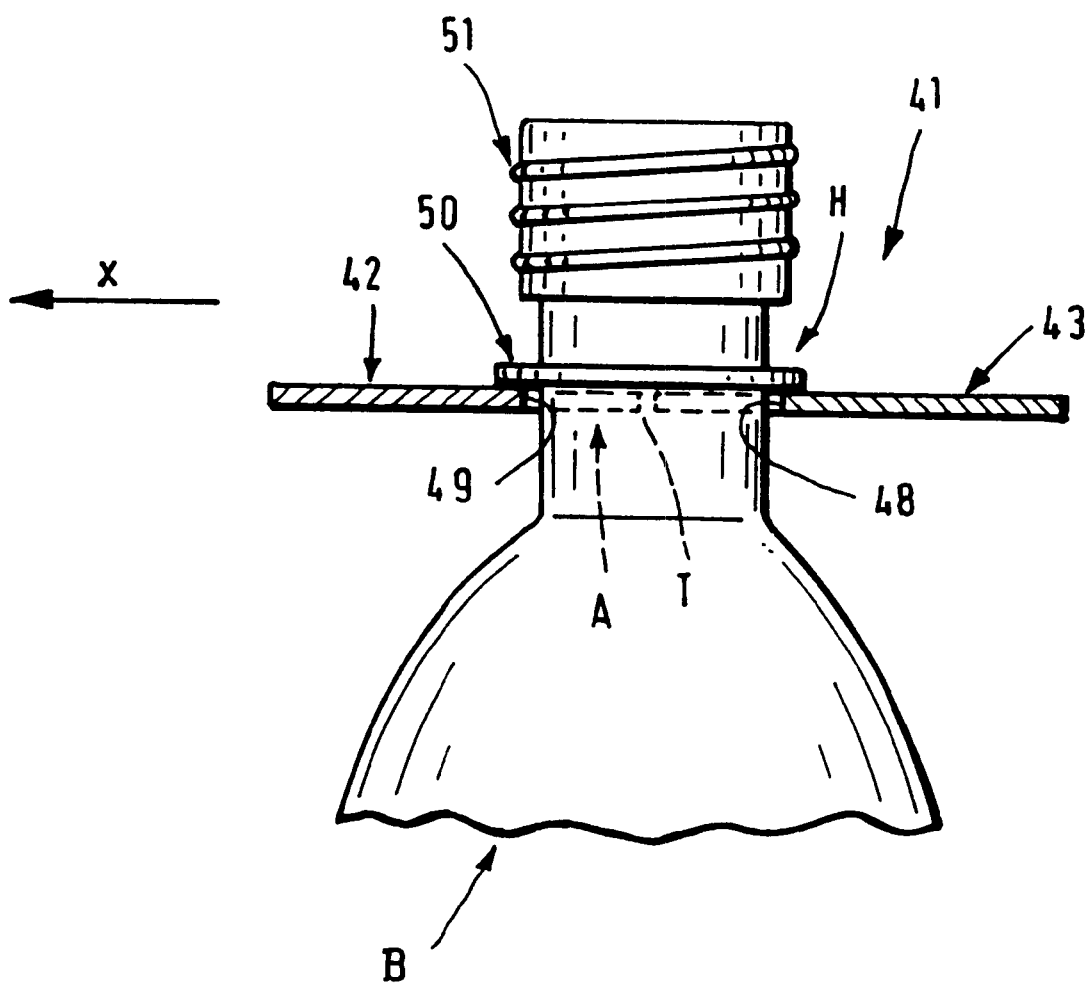
FIG. 8 is a larger-scale view of a bottle top.
Figure 9:
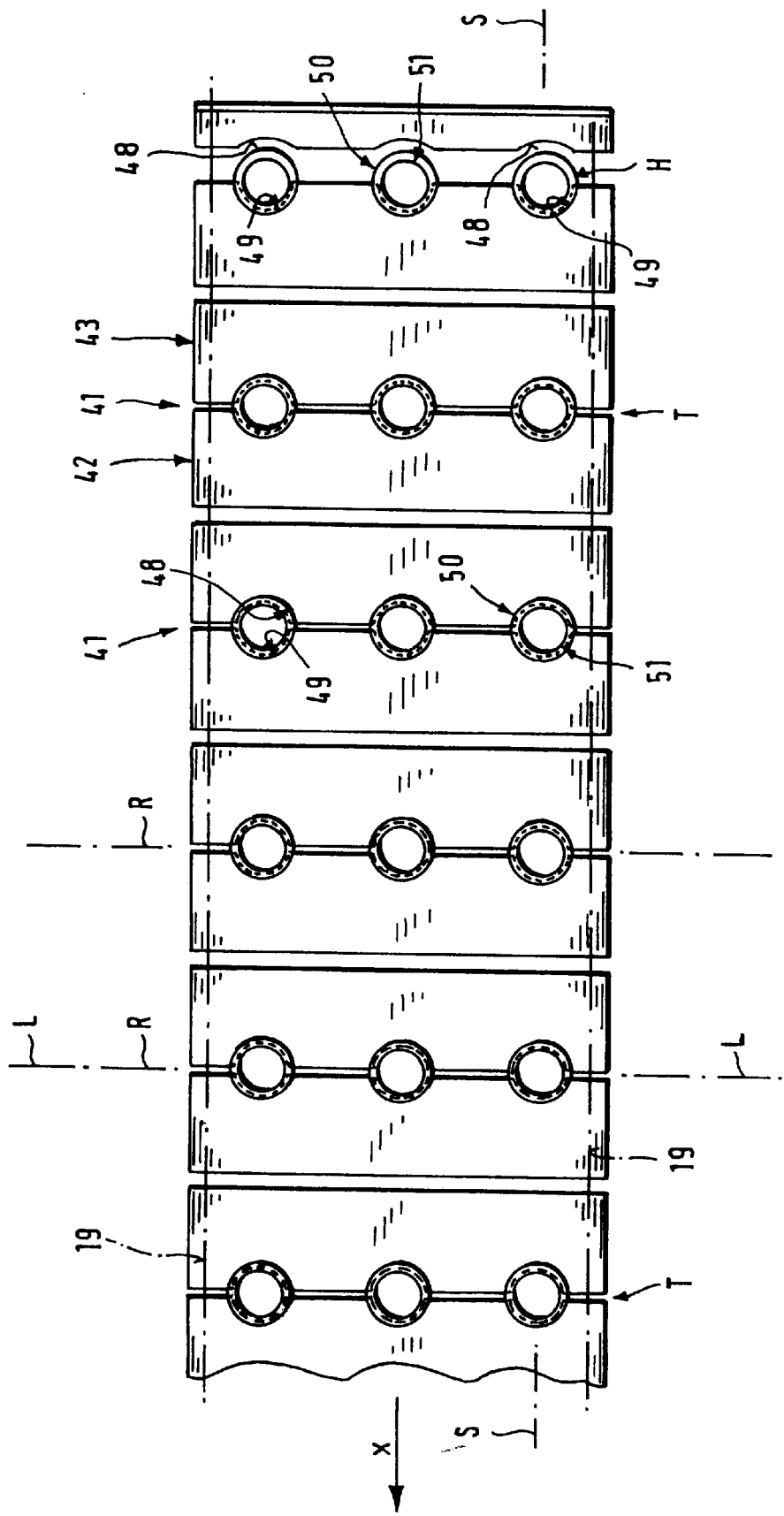
FIG. 9 is a top view of the conveyor of the bottling system.

The conveyor chain 19 carries a series of holders 41 each formed as best shown in FIG. 9 of a pair of plates 42 and 43 that have confronting edges at a joint T where they are each formed with three semicircular cutouts 48 and 49 forming seats A (FIG. 2) aligned in columns S parallel to the direction x and rows R perpendicular thereto and centered on transverse lines L. The bottles B each have as shown in FIG. 8 a neck H formed with a radially outwardly projecting rim 50 adapted to sit on the top faces of the plates 42 and 43, with a threaded portion 51 of each neck H extending upward from the conveyor 19. The plates 42 and 43 are separated by spacers 46 constituted as L-brackets 47 from the conveyor chain 19. Thus as the conveyor chain 19 goes around the corners 22 and 23 each plate 42 will separate from the respective plate 43 to open up the seats A and allow bottles B to be loaded in and taken out. Similarly at the downstream corner 23 the plates 42 and 43 separate so the bottles B are set down on the unloading conveyor 38.

Figure 3:
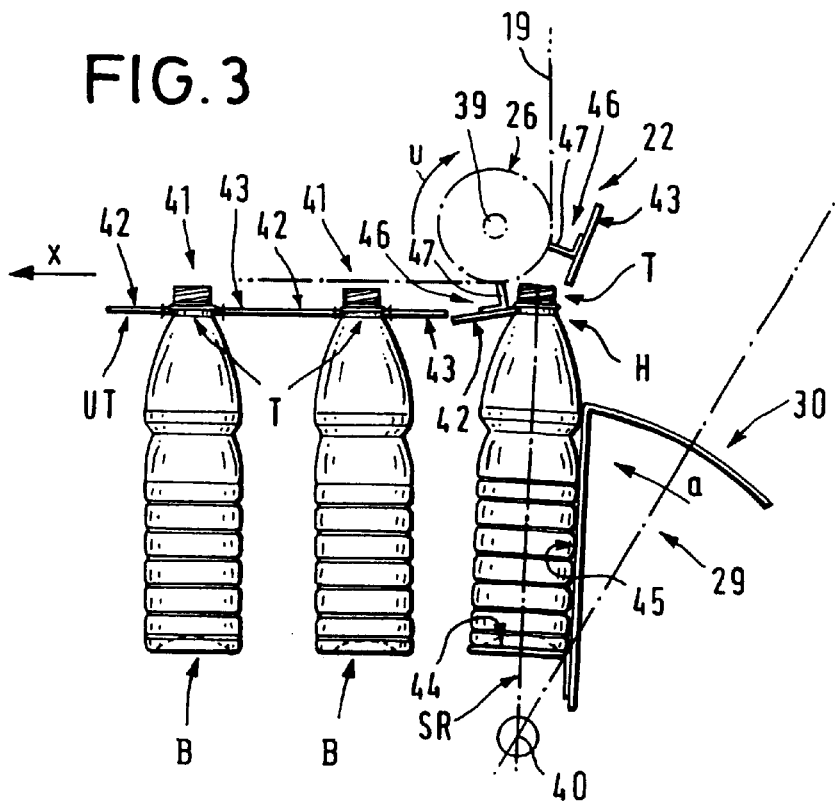
Figure 4:
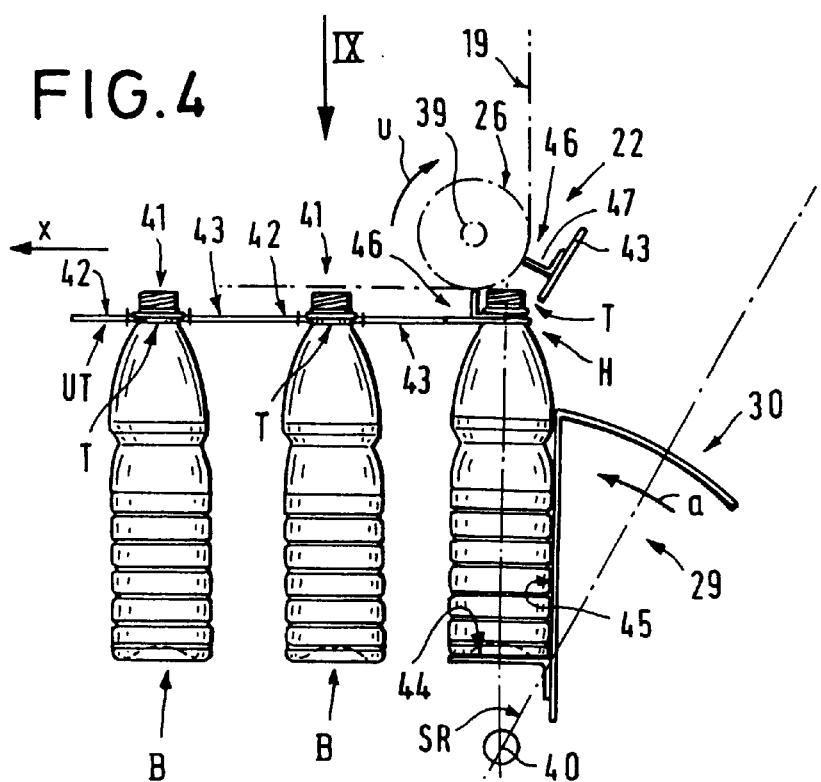
Figure 5:
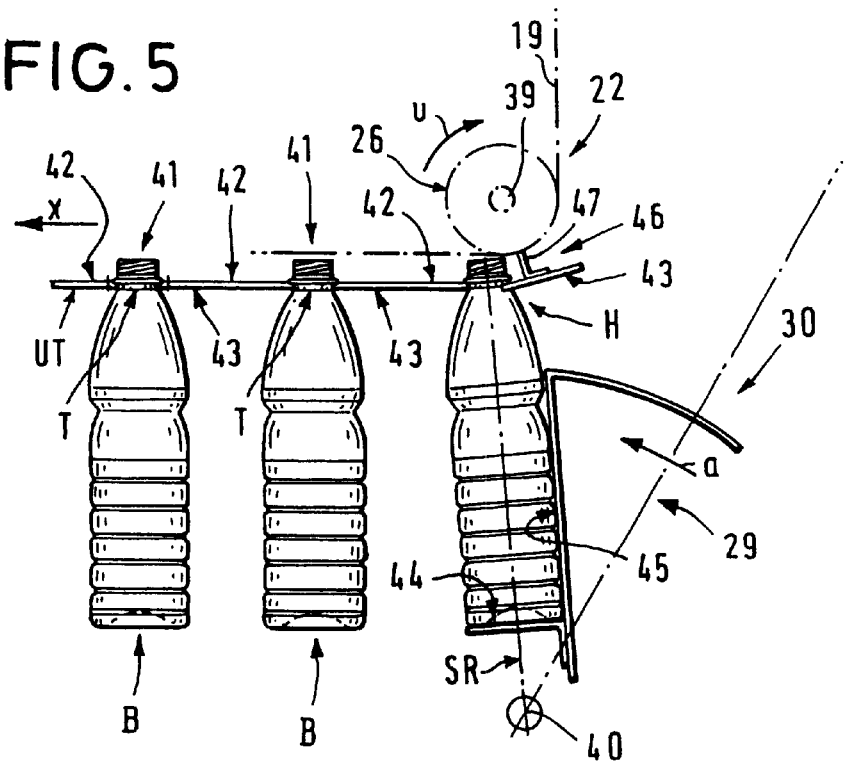
Figure 6:
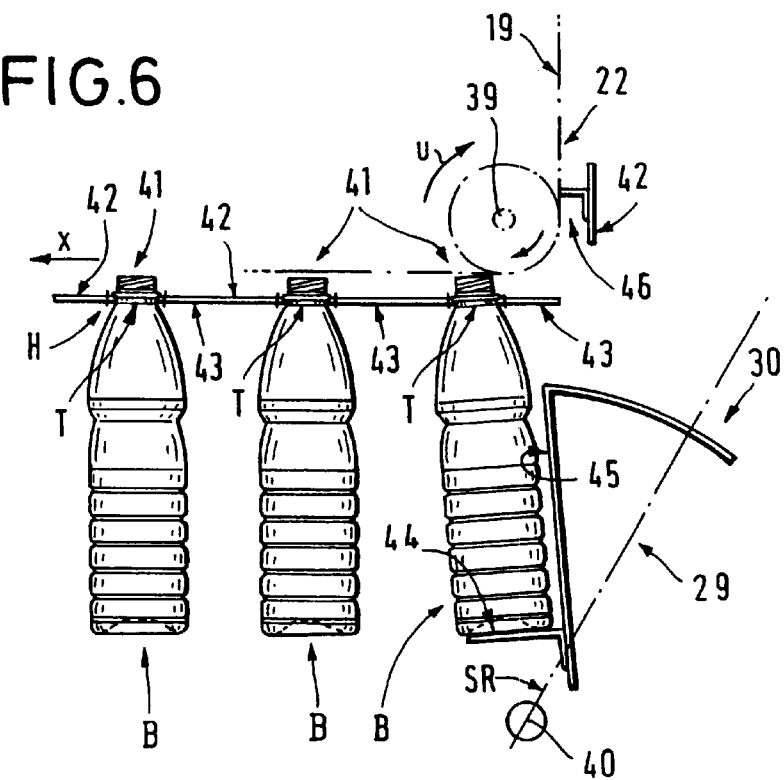
Figure 7:
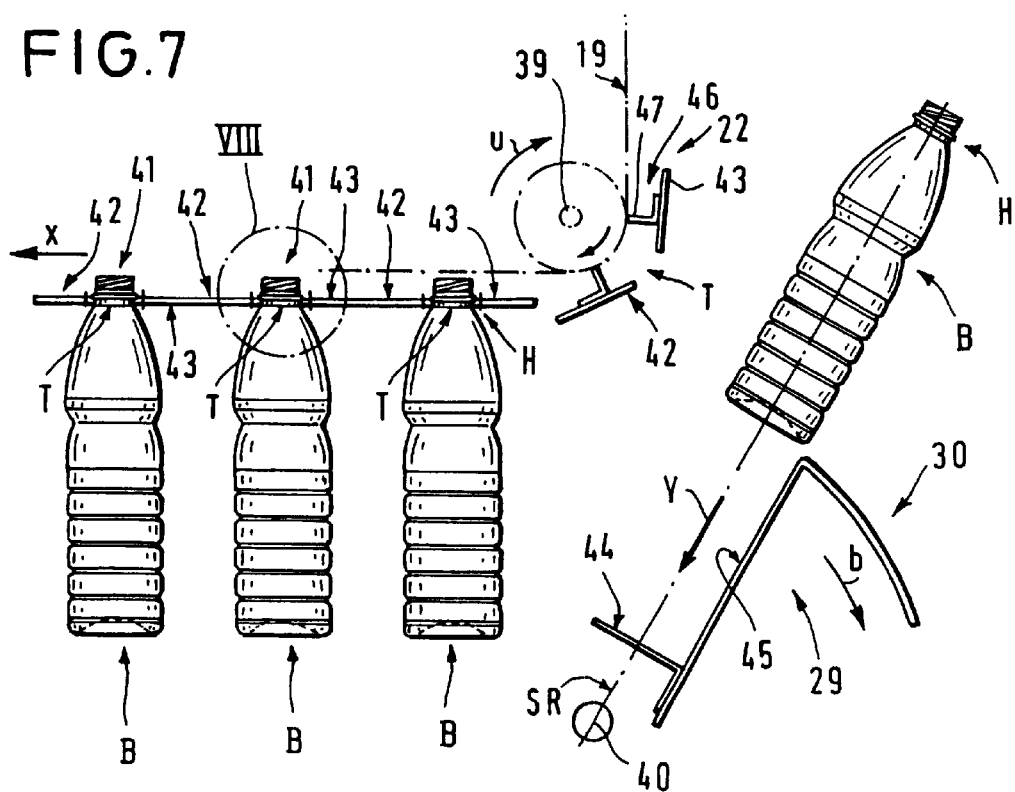

The loading device 29 is pivotal in directions a and b about an axis 40 parallel to the axle 39 of the corner roller 26 and comprises a base plate 44 on which the bottoms of the bottles B are set and a side plate 45 against which the sides of the bottles B rest. This loader 29 is pivoted up in the direction a from the position of FIG. 2 to that of FIG. 3 to fit the necks H of the bottles B it carries to the cutouts 49 of the leading plate 42 coming around the corner 22 and then as shown in FIGS. 4 and 5 the following plate 43 pivots into place to capture the necks H in the seats A. Then as shown in FIG. 6 the continuously advancing conveyor 19 picks the bottles B off the loader 29 so that, after the loader 29 has been pivoted back in the direction b as shown in FIG. 7, more bottles B can be slid down in direction Y into the loader 29.

I claim:

1. A bottling apparatus comprising:
   a frame;
   an endless conveyor element on the frame and having a horizontal lower stretch, an upper stretch above the lower stretch, and upstream and downstream corners where the element changes direction;
   a plurality of pairs of upstream and downstream plates each secured to the element, the plates of each pair having confronting edges each in turn formed with a cutout, the cutouts of each pair forming in the stretches a seat adapted to fit snugly around a neck of a bottle, the edges being spaced apart at the corners;
   drive means for advancing the element in a horizontal transport direction in the lower stretch and separating the plates of each pair at the upstream and downstream corners; and
   a holder adapted to support at least one bottle at the upstream corner and movable between a loading position fitting the neck of the supported bottle to the cutout of the downstream plate at the upstream corner and a preloading position offset from the upstream corner.

2. The bottling apparatus defined in claim 1, further comprising
   respective spacers holding each of the plates offset from the conveyor element, whereby as the plates move around the corners they are separated at the edges.

3. The bottling apparatus defined in claim 2 wherein the spacers are mounting brackets fixed to the element and to the respective plates.

4. The bottling apparatus defined in claim 1 wherein the cutouts are semicircular.

5. The bottling apparatus defined in claim 1 wherein the plates of each pair are substantially spectrally identical.

6. The bottling apparatus defined in claim 1 wherein each plate is formed with a plurality of the cutouts, whereby a row of the bottles can be held between each pair of plates.

7. The bottling apparatus defined in claim 1 wherein the holder is pivotal about a horizontal axis extending transverse to the transport direction between the loading and preloading positions.

8. The bottling apparatus defined in claim 7 wherein the holder is generally L-shaped.

9. The bottling apparatus defined in claim 1 wherein each bottle has a body that is substantially bigger than its neck, the seats fitting snugly around the neck and forming an opening too small for the body to pass through.

10. The bottling apparatus defined in claim 1 wherein the conveyor element has a upstream and downstream straight end stretches extending vertically between upstream and downstream ends of the upper and lower stretches.

11. The bottling apparatus defined in claim 10, further comprising above the lower stretch and below the lower stretch:
    means for filling and capping the bottles as they travel from the upstream corner to the downstream corner.

* * * * *